United States Patent
Feng et al.

(10) Patent No.: US 11,795,079 B2
(45) Date of Patent: Oct. 24, 2023

(54) DYNAMIC MEMBRANE REACTOR WITH FUNCTION OF NITROGEN AND PHOSPHORUS REMOVAL AND OPERATION METHOD THEREOF

(71) Applicant: ZHEJIANG GONGSHANG UNIVERSITY, Zhejiang (CN)

(72) Inventors: Huajun Feng, Zhejiang (CN); Meizhen Wang, Zhejiang (CN); Haibo Tao, Zhejiang (CN); Miao Lv, Zhejiang (CN); Yuqi Chen, Zhejiang (CN); Yingfeng Xu, Zhejiang (CN)

(73) Assignee: ZHEJIANG GONSHANG UNIVERSITY, Zhejiang (CN)

( * ) Notice: Subject to any disclaimer, the term of this patent is extended or adjusted under 35 U.S.C. 154(b) by 25 days.

(21) Appl. No.: 17/343,743

(22) Filed: Jun. 10, 2021

(65) Prior Publication Data
US 2022/0153617 A1    May 19, 2022

(30) Foreign Application Priority Data
Nov. 17, 2020   (CN) .......................... 202011286700.3

(51) Int. Cl.
*C02F 3/00*    (2023.01)
*B01D 71/30*    (2006.01)
(Continued)

(52) U.S. Cl.
CPC .............. *C02F 3/005* (2013.01); *B01D 71/30* (2013.01); *C02F 1/463* (2013.01); *C02F 3/305* (2013.01);
(Continued)

(58) Field of Classification Search
CPC .......... C02F 3/005; C02F 1/463; C02F 3/305; C02F 3/308; C02F 3/34; C02F 2101/105;
(Continued)

(56) References Cited

FOREIGN PATENT DOCUMENTS

| CN | 101857307 B | * | 7/2011 | ................ C02F 3/30 |
| CN | 102874978 | | 1/2013 | |

(Continued)

OTHER PUBLICATIONS

Translation of CN108217917A (Year: 2018).*
(Continued)

*Primary Examiner* — Ekandra S. Miller-Cruz
(74) *Attorney, Agent, or Firm* — JCIP Global Inc.

(57) ABSTRACT

The invention provides a dynamic membrane reactor with function of nitrogen and phosphorus removal and an operation method thereof, and comprises a biological treatment system, a dynamic membrane loading system and an automatic system. The operation method comprises the following steps. (1) Before the formation of dynamic membrane, a porous filter for phosphorus removal is used as a cathode, a conductive precision filter screen is used as an anode, and aerobic denitrifying bacteria are inoculated into the dynamic membrane reactor under certain constant current density, hydraulic retention time and flux. (2) After the dynamic membrane is formed, the porous filter for phosphorus removal is used as the anode, the conductive precision filter screen is used as the cathode. And intermittent aeration is started at the anode under certain constant current density. (3) When the transmembrane pressure difference exceeds a certain range, hydraulic backwashing is performed under certain constant current density.

6 Claims, 2 Drawing Sheets

(51) Int. Cl.
*C02F 1/463* (2023.01)
*C02F 3/30* (2023.01)
*C02F 3/34* (2023.01)
*C02F 101/10* (2006.01)
*C02F 101/16* (2006.01)

(52) U.S. Cl.
CPC ............ *C02F 3/308* (2013.01); *C02F 3/34* (2013.01); *C02F 2101/105* (2013.01); *C02F 2101/16* (2013.01); *C02F 2209/03* (2013.01); *C02F 2209/42* (2013.01); *C02F 2303/16* (2013.01)

(58) Field of Classification Search
CPC .............. C02F 2101/16; C02F 2209/03; C02F 2209/42; C02F 2303/16; C02F 3/1273; C02F 2201/4613; C02F 2201/4614; C02F 2209/06; C02F 2209/22; C02F 3/302; B01D 71/30; B01D 61/22; B01D 65/02; B01D 2321/04; B01D 61/18; Y02W 10/10

USPC ........................................... 210/630
See application file for complete search history.

(56) References Cited

FOREIGN PATENT DOCUMENTS

| | | | | | |
|---|---|---|---|---|---|
| CN | 104745507 | A | * | 7/2015 | ............ C02F 3/34 |
| CN | 108217917 | A | * | 6/2018 | ............ C02F 3/00 |
| CN | 109231675 | A | * | 1/2019 | ............ C02F 3/12 |
| WO | WO-2018190779 | A1 | * | 10/2018 | ............ C02F 3/30 |

OTHER PUBLICATIONS

Translation of CN101857307B (Year: 2011).*
Translation of CN104745507A (Year: 2015).*
Pseudomonas_aeruginosa_SD-1_NPL_Tang.pdf (Year: 2019).*
Translation of CN109231675A (Year: 2019).*

* cited by examiner

DYNAMIC MEMBRANE REACTOR WITH FUNCTION OF NITROGEN AND PHOSPHORUS REMOVAL AND OPERATION METHOD THEREOF

CROSS-REFERENCE TO RELATED APPLICATION

This application claims the priority benefit of China application serial no. 202011286700.3, filed on Nov. 17, 2020. The entirety of the above-mentioned patent application is hereby incorporated by reference herein and made a part of this specification.

BACKGROUND

Technical Field

The invention relates to the field of wastewater treatment technology and biological energy, in particular to a dynamic membrane reactor with function of nitrogen and phosphorus removal and an operation method thereof.

Description of Related Art

In the process of wastewater treatment, both dephosphorization and denitrification are required while organic matter degradation and suspended matter removal are completed. Therefore, the requirements of dephosphorization and denitrification should be comprehensively considered in the process of wastewater treatment, both functions and the contradiction between the two should be taken into account and coordinated. The dephosphorization and denitrification effect of the traditional process is not ideal. Therefore, it is urgent to develop a new method of denitrification and dephosphorization.

The wastewater dephosphorization methods are divided into chemical dephosphorization methods and biological dephosphorization methods. Chemical phosphorus removal methods require artificial addition of chemical phosphorus removal agents, which increase the operation cost, and the disposal cost of excess sludge is also expensive. What's more, in the current biological treatment process, sewage is subjected to biological biochemical treatment, and it is often necessary to add a solid-liquid separation process. Precipitation and membrane separation are common solid-liquid separation processes. The precipitation method is used for solid-liquid separation, and the sewage treatment process is longer and covers a large area, which limits its popularization and application to a certain extent. However, when the membrane separation technology is used for solid-liquid separation, traditional separation membranes are expensive and often accompanied by membrane fouling. A dynamic membrane refers to a mud cake formed on the surface of a base mesh through a mixed solution or a precoating agent in a reaction tank, which is a new membrane. The dynamic membrane technology has not only the advantages of the traditional membrane bioreactor but also the characteristics of large membrane flux and convenient backwashing, so that the dynamic membrane technology becomes a potential technology to overcome the defects of the traditional membrane technology.

The metal electrode is served as an anode of an electrolysis reaction, active metal ions are generated after electrolysis, and accompanied by a series of oxidation-reduction reactions, the metal ions and hydroxide in the water form generate a high-efficiency flocculant. In addition, some metal ions can also be used as trace elements necessary for microbial growth, play a role in promoting microbial growth, which can promote the growth of microorganisms, enhance the activity and abundance of microorganisms, etc., and also have certain influence on the formation and operation of dynamic membranes. The main form of denitrification is that hydrogen generated by the cathode can be served as an electron donor of denitrifying bacteria, and the oxygen generated by the anode can be served as an electron acceptor for nitrifying bacteria, thereby realizing simultaneous nitrification and denitrification.

Chinese patent CN 102874978A discloses a cathode loaded self-generating dynamic membrane bioreactor, which consists of a biological treatment system, a cathode loading system and an automatic control system. Combining the electro-flocculation technology with the dynamic membrane filtration technology, on the one hand, the metal ions generated by the electro-flocculation can strengthen the biological flocculation and improve the fluid loss of the mixed solution. On the other hand, due to the support of the cathode to the dynamic membrane, the micro bubbles generated by the cathode hydrogen evolution reaction change the porosity of the dynamic membrane and prolong the stable operation period of the dynamic membrane. However, this invention only improved the dynamic membrane reactor, and did not conduct research on nitrogen and phosphorus removal.

Therefore, compared with the prior art, the present invention has the advantages that the dynamic membrane is further treated, aerobic denitrifying bacteria are inoculated at the same time, efficient denitrification and dephosphorization are realized, a plurality of advantages are achieved. Therefore, the method has great application prospects.

SUMMARY

In order to solve the problems in the prior art, the present invention provides a dynamic membrane reactor with function of nitrogen and phosphorus removal, which combines an electrocoagulation technology and a dynamic membrane filtration technology. On the one hand, biological flocculation behavior has been strengthened and filtration performance been improved by the metal ions generated by electrocoagulation; on the other hand, the dynamic membrane is loaded on the titanium mesh, so that the stable operation of the dynamic membrane is realized, and the problem of denitrification and dephosphorization is solved.

In order to achieve the object, the technical solution adopted by the invention is as follows.

The present invention provides a dynamic membrane reactor with function of nitrogen and phosphorus removal, which comprises a biological treatment system, a dynamic membrane loading system and an automatic system.

As a further alternative, the biological treatment system comprises an intake pump, an aeration pump, an aeration pipe, a dynamic membrane module, a suction pump and an outlet pipe, which the aeration pump is connected to the aeration pipe, the aeration pipe is located right below the dynamic membrane module, and experimental water can be obtained through the suction pump.

Furthermore, the dynamic membrane module comprises a porous filter for phosphorus removal and a conductive precision filter, and the volume of the dynamic membrane module accounts for 5%-15% of the dynamic membrane reactor.

As a further alternative, the dynamic membrane module comprises two layers of phosphorus removal porous filter on the inner layer and two layers of conductive precision filter on the outer layer. The distance between the phosphorus removal porous filter and the conductive precision filter is 5 mm-10 mm; the distance between the two dephosphorization porous filters is 10 mm-20 mm, and an insulator partition plate is arranged between the two phosphorus removal porous filters as a support frame.

As a further alternative, the substrate of the dynamic membrane module is made of polyvinyl chloride, the outer frame of the porous filter for phosphorus removal with 1 cm-5 cm pore diameter is a titanium plate; the conductive precision filter screen is formed by a twill weave mode with a titanium mesh as the base material, and the pore size of the titanium mesh is 5 um-10 um.

Furthermore, in the porous filters for phosphorus removal, a titanium plate is used as an outer frame, and the area ratio of the outer frame to the porous filters for phosphorus removal is 5-20%. The inner part is formed from iron wires or aluminum wires in a twill weaving mode, and wires of electrodes are directly connected to the outer frame.

Furthermore, the dynamic membrane loading system is connected to an external power supply and comprises a direct-current voltage-stabilized power supply and a load interface.

As a further alternative, the automatic system comprises a liquid level controller, a time relay and a pressure sensor, wherein the liquid level controller outputs a liquid level signal to adjust the water intake. The time relay is connected to a direct-current voltage-stabilized power supply to control the running time of electrocoagulation; the data of pressure sensor is detected by a computer to control the operational time of backwashing system.

The invention also provides an operation method of the dynamic membrane reactor, which comprises the following steps:

(1) Before the dynamic membrane is formed, the porous filter for phosphorus removal is used as a cathode, the conductive precision filter screen is used as an anode, and constant current density, hydraulic retention time and flux parameters are set;

(2) After the dynamic membrane is formed, the porous filter for phosphorus removal is used as the anode and the conductive precision filter screen is used as the cathode, and aerobic denitrifiers are inoculated into the dynamic membrane reactor under certain constant current density, hydraulic retention time and flux;

(3) When the transmembrane pressure difference exceeds a certain value, the hydraulic backwashing is performed under a certain constant current density.

Furthermore, in the step (1), the constant current density is 0-2 $A/m^2$, the hydraulic retention time is 6-9 h, and the flux is set to be 20-200 LMH.

Furthermore, in the wastewater in the dynamic membrane reactor in the step (1), C/N=3-5, dissolved oxygen is 2-3 mg/L, pH is 6-9, and activated sludge concentration is 2-5 g MLSS/L.

Furthermore, the aerobic denitrifiers inoculated in the step (1) are *Pseudomonas aeruginosa* SD-1 which is inoculated every 3 days, the amount of inoculation each time is 1% of the total volume, the inoculation is carried out 3-6 times, and the OD value of inoculum is 1-2.

Furthermore, in the step (2), the constant current density is 2-2.5 $A/m^2$, conditions for formatting dynamic membrane are that the transmembrane pressure difference reaches 0.02 MPa-0.05 MPa and turbidity of effluent water is less than 2NTU, and it is an operation period of the dynamic membrane reactor from the dynamic membrane formation to the backwashing.

Furthermore, conditions for the backwashing in the step (3) are such that when the transmembrane pressure difference exceeds 0.03 MPa, backwashing flow is maintained at 100-137.90 kPa for 1-5 min at a constant current density of 2-2.5 $mA/cm^2$.

The invention has the technical effects in the following.

1. Since the operation process is mainly controlled by a computer, the dynamic membrane reactor has a high degree of automation.

2. The combination of electrocoagulation and dynamic membrane technology can effectively achieve the effect of denitrification and dephosphorization.

3. The self-generated dynamic membrane can prolong the cleaning period of the membrane, which is conducive to the reduction of economic costs.

4. Simultaneous denitrification and dephosphorization can be achieved by inoculating *Pseudomonas aeruginosa* SD-1.

The text labels in the figures are shown as follows: 1. water inlet; 2. stainless steel wire; 3. iron net; 4. titanium plate; 5. water outlet pipe; 6. pressure sensor; 7. dephosphorization porous filter; 8. conductive precision filter screen; 9. partition plate; 10. liquid level controller; 11. control time relay; 12. direct-current voltage-stabilized power supply; 13. water inlet pipe; 14. water inlet pump; 15. suction pump; 16. dynamic membrane module; 17. aeration pipe; 18. aeration pump; 19. load interface.

DESCRIPTION OF THE EMBODIMENTS

In order that the technical means, inventive features, attaining objects and effects of the present invention easy to be understood, the present invention will be further elucidated with reference to specific embodiments thereof, but the following embodiments are merely preferred embodiments of the present invention and are not intended to be exhaustive. Based on the embodiments, those skilled in the art will be able to obtain other embodiments without involving any inventive effort, which fall within the scope of the present invention.

Figure 1:
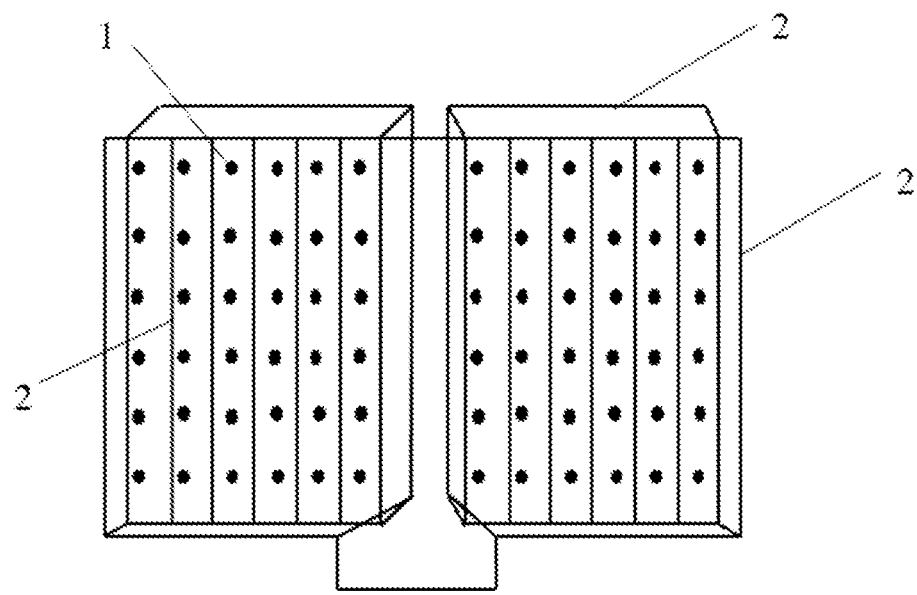
FIG. 1 is a schematic view showing a main structure of a partition plate in the middle of an electrode of the present invention.
Figure 2:
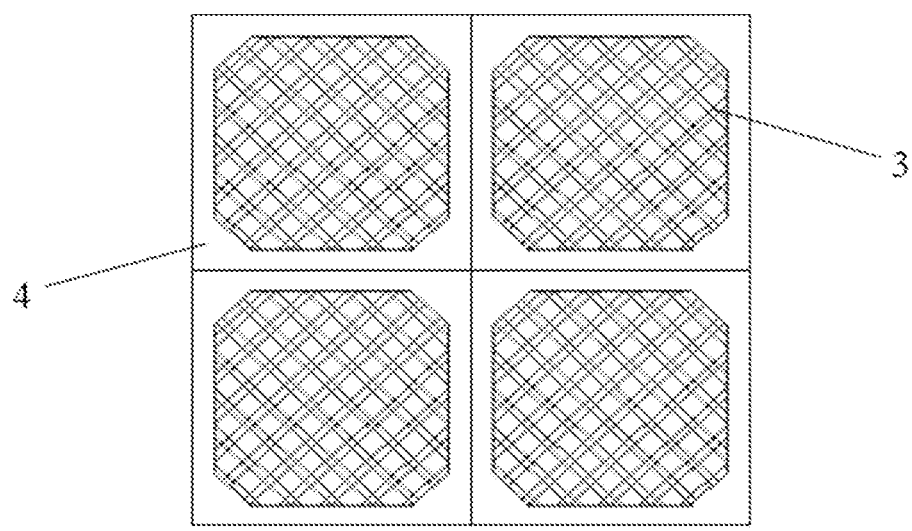
FIG. 2 is a schematic view showing a structure of a porous filter for phosphorus removal of the present invention.
Figure 3:
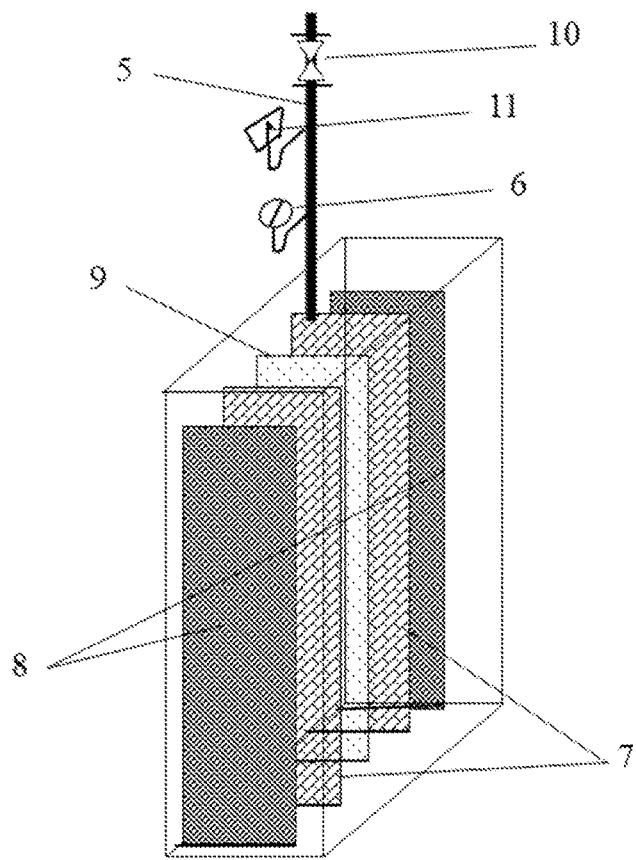
FIG. 3 is a schematic view showing a structure of a dynamic membrane module of the present invention.
Figure 4:
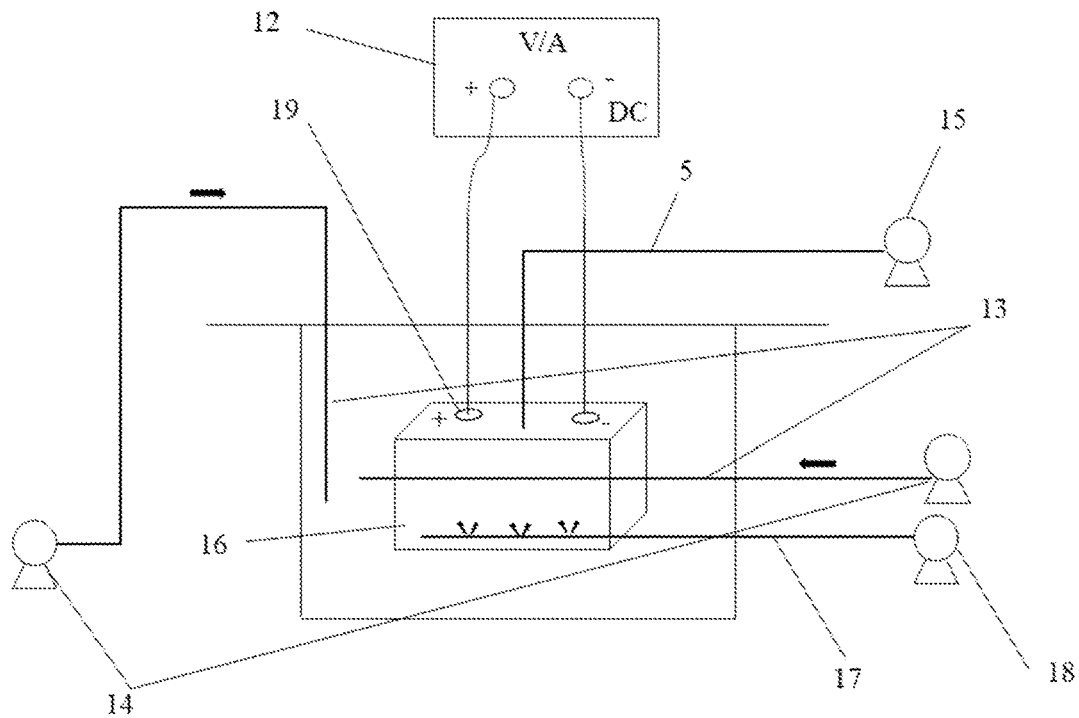
FIG. 4 is a schematic view showing a structure of the dynamic membrane reactor with function of nitrogen and phosphorus removal of the present invention.

As shown in FIGS. 1-4, the technical solution adopted by the invention is a dynamic membrane reactor with function of nitrogen and phosphorus removal, which comprises a biological treatment system, a dynamic membrane loading system and an automatic system. The biological treatment system comprises a water intake pump 14, an aeration pipe 17, a dynamic membrane module 16 and a water outlet pipe 5, wherein an aeration pump 18 is connected to the aeration pipe 17, the aeration pipe 17 is located right below the dynamic membrane module 16. The experimental water can be obtained through a suction pump 15. A dephosphorization porous filter screen 7 and a titanium plate 4 in the dynamic membrane module 16 serve as an outer frame, an iron screen 3 formed by iron wires in a twill weave mode is arranged in an inner part. The wires of electrodes are directly connected to the outer frame, an insulator partition plate 9 serves as a support frame between the two electrodes, and a conductive precision filter screen 8 in the dynamic membrane module 16 is formed from taking the titanium screen as a base material in a twill weave mode. The dynamic membrane loading system is connected to an external power supply and comprises a direct-current voltage-stabilized power supply 12 and a load interface 19. The automatic system comprises a liquid level controller 10, a time relay 11 and a pressure sensor 6, wherein the liquid level controller 10 outputs a liquid level signal to adjust water inlet amount. The electrocoagulation operation time is controlled by the time relay 11 which is connected to the direct-current voltage-stabilized power supply 12, while, the data of the pressure sensor 6 is detected and the backwashing system operation time is controlled by a computer.

Furthermore, the volume of the dynamic membrane module accounts for from 5% to 15% of the dynamic membrane reactor.

Furthermore, the distance between the porous filter for phosphorus removal and its adjacent conductive precision filter screen is 5 mm-10 mm, the distance between the two porous filters for phosphorus removal is 10 mm-20 mm, and an insulator partition plate is arranged between the two phosphorus removal porous filter to serve as a support frame.

Furthermore, the substrate of the dynamic membrane module is made of polyvinyl chloride, a material of the porous filter for phosphorus removal with the 1 cm-5 cm pore diameter is made of iron wires or aluminum wires; the conductive precision filter screen is formed by a twill weave mode with a titanium mesh as the base material, and the pore size of the titanium mesh is 5 um-10 um.

Furthermore, in the porous filter for phosphorus removal, an area ratio of the outer frame to the porous filter for phosphorus removal is 5%-20%, and the inner part of the porous filters for phosphorus removal is an iron screen formed by iron wires in a twill weave mode.

An operation method of a dynamic membrane reactor with function of nitrogen and phosphorus removal comprises the following steps:

(1) Before the formation of the dynamic membrane, the porous filter for phosphorus removal is used as a cathode, and the conductive precision filter screen is used as an anode, and constant current density, hydraulic retention time and flux parameters are set.

(2) After the dynamic membrane is formed, the porous filter for phosphorus removal is used as the anode and the conductive precision filter screen is used as the cathode, and aerobic denitrifying bacteria are inoculated into the dynamic membrane reactor under certain constant current density, hydraulic retention time and flux.

(3) When the transmembrane pressure difference exceeds a certain value, the hydraulic backwashing is performed under certain constant current density.

According to the operation method described above, the following embodiments are given.

Embodiment 1

The dynamic membrane reactor with function of nitrogen and phosphorus removal comprises a biological treatment system, a dynamic membrane loading system and an automatic system; meanwhile, the biological treatment system comprises a water inlet pump, an aeration pipe, a dynamic membrane module and a water outlet pipe, the aeration pump is connected to the aeration pipe. The aeration pipe is located right below the dynamic membrane module, and experimental water is obtained through the suction pump; while, the dynamic film loading system is connected to an external power supply and comprises a direct-current voltage-stabilized power supply and a load interface. The automatic system comprises a liquid level controller, a time relay and a pressure sensor, wherein the liquid level controller outputs a liquid level signal and regulates water inlet amount. The electrocoagulation operation time is controlled by the time relay which connected to a direct-current voltage-stabilized power supply, the pressure sensor data is detected and the backwashing system operation time is controlled by a computer. The volume of the dynamic membrane module accounts for 8% of the dynamic membrane reactor. The distance between the porous filter for phosphorus removal and the conductive precision filter screen is 5 mm, and the distance between electrodes of the inner layer is 10 mm. The pore diameter of the porous filter for phosphorus removal which is made of iron wires is 1 cm, in the meanwhile, the ratio of the outer frame which is made of a titanium plate to the titanium plate is 10%; and the pore diameter of the titanium mesh of the conductive precision filter screen is 6 μm.

The dynamic membrane reactor with function of nitrogen and phosphorus removal and the operation method comprise the following steps.

(1) Before the formation of the dynamic membrane, the porous filter for phosphorus removal is used as the cathode, and the conductive precision filter screen is used as the anode. The constant current density is set to 1 $A/m^2$, the hydraulic retention time is 6 h, the flux is 40 LMH, the wastewater C/N=5, the dissolved oxygen is 2 mg/L, the pH is 7.0, and the activated sludge concentration is 2 g MLSS/L. At the same time, aerobic denitrifying bacteria are inoculated into the dynamic membrane reactor, wherein the aerobic denitrifying bacteria are *Pseudomonas aeruginosa* SD-1 which is inoculated every 3 days, the amount of inoculation each time is 1% of the total volume, the inoculation is carried out four times, and the OD value of the inoculation bacteria liquid is 1.

(2) When the transmembrane pressure difference reaches 0.03 MPa and the turbidity of the effluent is less than 2 NTU, the dynamic membrane is considered to be formed. After the dynamic membrane is formed, the porous filter for phosphorus removal is used as the anode, the conductive precision filter screen is used as the cathode, the constant current density is 2 $A/m^2$, and intermittent aeration is started at the anode.

(3) The transmembrane pressure difference is greatly increased, and the effluent quality index fluctuates greatly. When TMP exceeds 0.03 MPa, backwashing is required. At this time, hydraulic backwashing is carried out at constant current density of 2 $mA/cm^2$, and the backwashing flow is maintained at 100 kPa for 2 min.

Comparative Example 1

The difference of Comparative Example 1 from Embodiment 1 is only that the dynamic membrane reactor does not contain neither a porous filter for phosphorus removal nor a conductive precision filter screen and does not have an external power supply.

Comparative Example 2

The difference of Comparative Example 2 from Embodiment 1 is that no aerobic denitrifying bacteria is inoculated.
Performance Testing The inlet and outlet water quality and the operation of the dynamic membrane of Example 1 and Comparative Examples 1-2 are examined, respectively.

TABLE 1

Water quality of inlet and outlet water

|  | influent TP concentration (mg/L) | influent TN concentration (mg/L) | effluent TP concentration (mg/L) | effluent TN concentration (mg/L) | TN removal rate (%) | TP removal rate (%) |
| --- | --- | --- | --- | --- | --- | --- |
| Embodiment 1 | 20.5 | 9.4 | 0.3 | 2.2 | 76.6 | 98.5 |
| Comparative Example 1 | 20.5 | 9.4 | 20 | 6.3 | 33.0 | 2.4 |
| Comparative Example 2 | 20.5 | 9.4 | 1.3 | 3.8 | 59.6 | 93.7 |

TABLE 2

Operation of dynamic membrane

|  | stable operation time of dynamic membrane (d) | turbidity removal rate (%) |
| --- | --- | --- |
| Embodiment 1 | 15 | 95 |
| Comparative Example 1 | 5 | 40 |
| Comparative Example 2 | 11 | 80 |

As can be seen from Tables 1 and 2, the denitrification and dephosphorization effect of the dynamic membrane reactor with function of nitrogen and phosphorus removal is obviously better than that of the comparative examples. The denitrification rate of the dynamic membrane reactor in Embodiment 1 reaches 76.6%, and the dephosphorization rate reaches 98.5%, wherein the denitrification and dephosphorization effect of the dynamic membrane reactor in Embodiment 1 is optimal, and the dynamic membrane reactor has a large application prospect.

Finally, it should be noted that the description is only intended to illustrate the technical solution of the present disclosure and is not intended to limit the scope of protection of the present disclosure. And that those skilled in the art will be able to make simple modifications or equivalent alterations to the technical solution of the present disclosure without departing from the essence and scope of the technical solution of the present disclosure.

What is claimed is:

1. An operation method of a dynamic membrane reactor with function of nitrogen and phosphorus removal, wherein the dynamic membrane reactor comprises a biological treatment system, a dynamic membrane loading system and an automatic system; meanwhile, wherein the biological treatment system comprises an intake pump, an aeration pump, an aeration pipe, a dynamic membrane module comprises a porous filter for phosphorus removal and a conductive precision filter, a suction pump and an outlet pipe; the aeration pump is connected to the aeration pipe, the aeration pipe is located directly below the dynamic membrane module, and an experimental water is obtained through the suction pump; while, the dynamic membrane loading system is connected to an external power supply and comprises a direct-current voltage-stabilized power supply and a load interface; the automatic system comprises a liquid level controller, a time relay and a pressure sensor; the liquid level controller outputs a level signal to adjust an amount of a water intake; the time relay is connected to the direct-current voltage-stabilized power supply to control a running time of electrocoagulation; the data of the pressure sensor is detected by a computer to control the operation time of backwashing system, wherein the operation method comprises the following steps: step 1, before forming a dynamic membrane, the porous filter for phosphorus removal is used as a cathode, the conductive precision filter is used as an anode, and aerobic denitrifiers are inoculated into the dynamic membrane reactor under constant current density of 0-2 A/m$^2$, hydraulic retention time of 6-9 h and flux of 20-200 LMH; step 2, after forming the dynamic membrane, the porous filter for phosphorus removal is used as the anode, the conductive precision filter is used as the cathode, an intermittent aeration is started at the anode under constant current density of 2-2.5 A/m$^2$ when an activated sludge provides a pollutant removal effect, while hydrogen is generated near the cathode and an effective anoxic environment is formed; and step 3, when a transmembrane pressure difference exceeds 0.03 MPa, a hydraulic backwashing is performed under constant current density of 2-2.5 mA/cm$^2$, wherein a backwashing flow is maintained at 100-137.90 kPa for 1-5 min in the hydraulic backwashing, wherein in the step 2, the dynamic membrane is formed to complete one operation cycle of the dynamic membrane reactor when the transmembrane pressure difference reaches 0.02 MPa-0.05 MPa, and a turbidity of an effluent is less than 2NTU.

2. The operation method of the dynamic membrane reactor with function of nitrogen and phosphorus removal according to claim 1, wherein in a wastewater in the dynamic membrane reactor in the step 1, C/N=3-5, a dissolved oxygen is 2-3 mg/L, pH is 6-9, and an activated sludge concentration is 2-5 g MLSS/L.

3. The operation method of the dynamic membrane reactor with function of nitrogen and phosphorus removal according to claim 1, wherein in the step 1, the aerobic denitrifiers inoculated are Pseudomonas aeruginosa SD-1, which is inoculated every 3 days; the volume amount of inoculation each time is 1% of an effective volume of the dynamic membrane reactor, the inoculation is carried out 3-6 times, and an OD value of inoculum is 1-2.

4. The operation method of the dynamic membrane reactor with function of nitrogen and phosphorus removal according to claim 1, the volume of the dynamic membrane module accounts for 5%-15% of the volume of the dynamic membrane reactor.

5. The operation method of the dynamic membrane reactor with function of nitrogen and phosphorus removal according to claim 4, wherein the dynamic membrane module further comprises two layers of the porous filters for phosphorus removal on an inner layer and two layers of the conductive precision filter on an outer layer; a distance between the porous filter for phosphorus removal and an adjacent conductive precision filter is 5 mm-10 mm; a distance between the two porous filters for phosphorus removal is 10 mm-20 mm; and an insulator partition plate is arranged between the two porous filters for phosphorus removal as a support frame.

6. The operation method of the dynamic membrane reactor with function of nitrogen and phosphorus removal according to claim 4, wherein a substrate of the dynamic membrane module is made of polyvinyl chloride; an outer frame of the porous filter for phosphorus removal with 1 cm-5 cm pore diameter is a titanium plate, and an area ratio of the outer frame to the porous filter for phosphorus removal is 5%-20%; an inner part of the outer frame is formed from iron wires or aluminum wires in a twill weaving mode with a pore diameter ranging 1 cm -5 cm, and wires of electrodes are directly connected to the outer frame; the conductive precision filter is formed by titanium meshes in a twill weave mode with the pore diameter ranging 5 um -10 um.

* * * * *